United States Patent Office 2,924,700
Patented Feb. 9, 1960

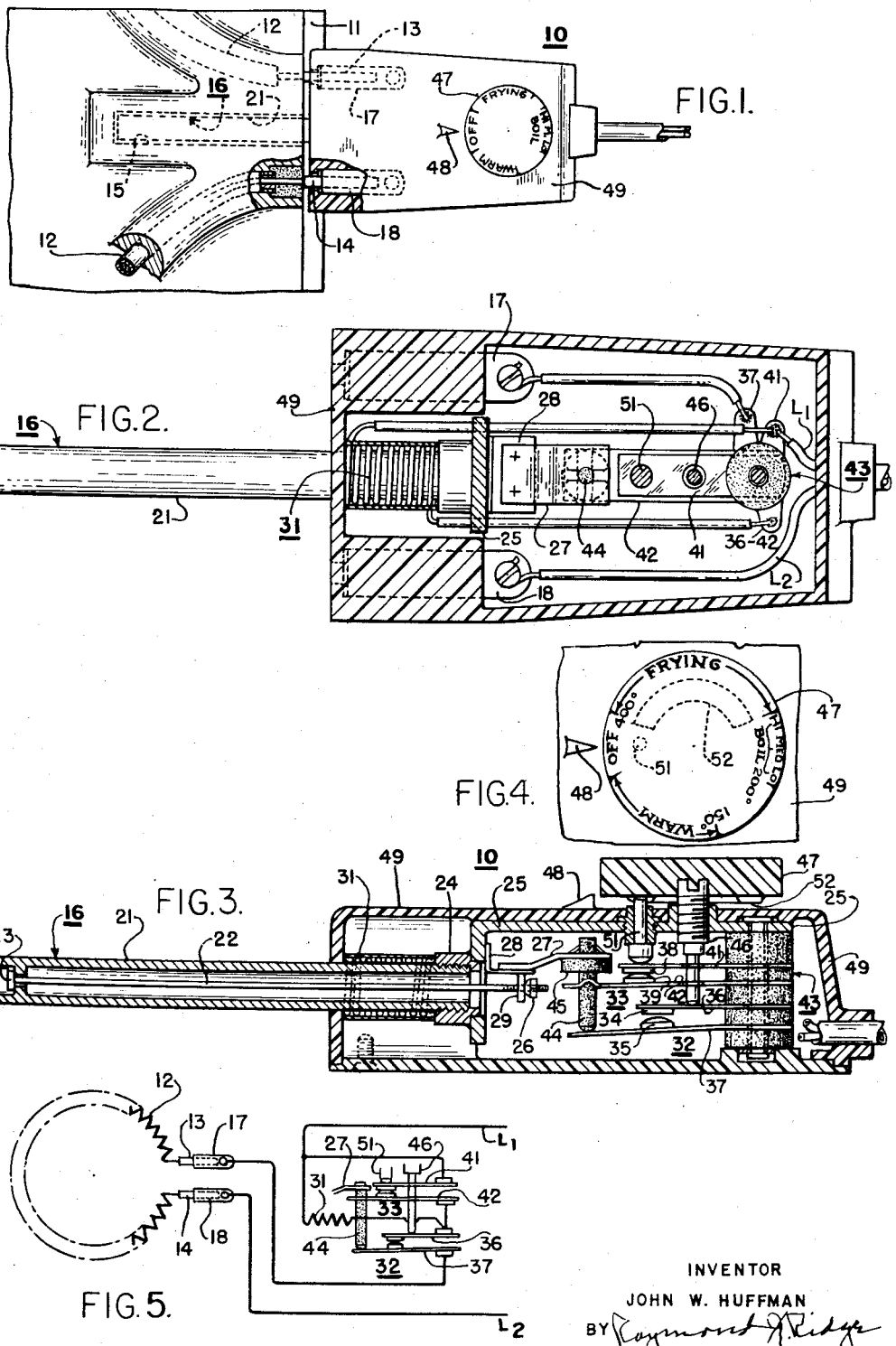

2,924,700
CONTROL FOR COOKING VESSEL

John W. Huffman, Mansfield, Ohio, assignor to Westinghouse Electric Corporation, East Pittsburgh, Pa., a corporation of Pennsylvania Application August 19, 1958, Serial No. 755,938

1 Claim. (Cl. 219—44)

This invention relates to a control mechanism for an electrically heated cooking vessel in which operations at water boiling temperatures and other cooking operations at higher and lower temperatures are carried out. An object of the invention is to provide an improved control mechanism of this type.

It is a further object of the invention to provide a simplified, low cost control of the class set forth which may be readily removed from the appliance for facilitating cleaning thereof or, for application to another cooking device.

The mechanism includes, preferably, a rod and tube thermostat responsive to vessel temperature and, during boiling, to heat from an auxiliary heater. The thermostat is movable for the actuation of a main switch in series with the main heater of the cooking vessel, as well as an auxiliary switch shunting the auxiliary heater. The auxiliary heater is in series with the main heater and is, therefore, controlled by the main switch. The switches are biased closed and are cycled by the thermostat. The arrangement is such that the main switch is cycled responsive to the vessel temperature in a low temperature range below the boiling temperature of water. In the boiling range, the shunting switch is opened by the thermostat for activating the auxiliary heater so that, the thermostat receives heat from the vessel and the auxiliary heater. Accordingly, the thermostat is cycled to provide low or high intensities of boiling. In the high temperature range, the shunting switch is forced closed by the manually operated adjusting handle for inactivating the auxiliary heater. Accordingly, the thermostat again becomes responsive solely to vessel temperature in the upper range.

The foregoing and other objects are effected by the invention as will be apparent from the following description and claim taken in connection with the accompanying drawings, forming a part of this application, in which:

Fig. 1 is a plan view of a fragment of a cooking vessel, having a control constructed and arranged in accordance with the invention applied thereto;

Fig. 2 is a plan view of the control mechanism with the enclosing case broken away;

Fig. 3 is a vertical section taken centrally through the mechanism shown in Fig. 2;

Fig. 4 is a view showing indicia associated with the control handle; and

Fig. 5 is a diagram of the electrical connections for the apparatus shown in Figs. 1 to 4, inclusive.

Reference will now be had to the drawings and particularly to Fig. 1 wherein the improved control mechanism, generally indicated at 10, is shown applied to a cooking vessel 11 of any suitable construction and in which relatively low and high temperature cooking operations, as well as boiling operations, are carried out. The vessel 11 includes a heating element of conventional construction and shown at 12, terminals 13 and 14 of which extend outwardly at one side of the vessel. The element 12 may be of the well-known sheath type and cast integrally with the vessel 11. The vessel 11 also is provided with an elongated well 15 for the reception of a rod and tube type thermostatic element indicated at 16 and forming a part of the control mechanism 10. The control mechanism 10 includes spring type terminals 17 and 18 for gripping the pin terminals 13 and 14 whereby the control 10 is firmly held at one side of the vessel 11 and may serve as a handle for the vessel. The control 10 may be readily removed from the vessel 11 so that the latter may be immersed in water for cleaning. Also, it will be understood that the control 10 is adapted for attachment to other forms of cooking vessels to be thermostatically controlled.

Reference will now be had to Figs. 2 and 3 for a description of the control mechanism 10. The thermostatic element 16 forming a part of the control 10 is of the well-known rod and tube type and includes a tube 21 formed of material having a relatively high coefficient of expansion. The rod 22 is formed of material having a relatively low coefficient of expansion and the outer ends of the tube 21 and rod 22 are secured together in any suitable manner as indicated at 23. The opposite end of the tube 21 is threaded or otherwise fixed, as shown at 24, to a relatively stiff frame 25. The inner end of the rod 22 is threaded to receive an adjusting nut 26, the latter engaging a swinging bracket 27 for the actuation of switches to be referred to hereinafter. The bracket 27 is carried by an L-shaped spring 28, one end of which is fixed to the bracket 27 and the opposite end of which is secured in any suitable manner, as by welding, to the frame 25. The arrangement is such that the spring 28 biases the bracket 27 counterclockwise at all times. An arm 29 of the bracket 27 engages the adjusting nut 26 so that the bracket 27 may be adjusted relative the rod 22.

The thermostatic element 16 is in intimate heat transfer relationship with the cooking vessel 11 so that it expands and contracts with increases and decreases in the temperature of the vessel. As described more in detail hereinafter, the thermostatic element is also heated during boiling operations by a relatively small auxiliary heater indicated at 31 and in intimate heat transfer relationship with the tube 21. It will be understood that the heater 31 is suitably insulated electrically from the tube 21.

The main heater 12 of the vessel is controlled by a main switch generally indicated at 32, and energization of the auxiliary heater 31 is under control of a shunting switch 33 connected in shunt with the auxiliary heater 31, as referred to hereinafter. The main switch 32 includes relatively movable contacts 34 and 35 carried, respectively, by resilient spring supports 36 and 37. The auxiliary switch 33 includes contacts 38 and 39 carried, respectively, by spring supports 41 and 42. The spring supports 36, 37, 41 and 42 are insulated from each other in a switch stack 43 that is secured in any suitable manner to the frame 25. Suitable terminals extend from the respective spring supports as shown in Fig. 2.

The electrical connections between the switches 32 and 33 and main heating element 12 and auxiliary heating element 31 are clearly shown in Fig. 5. From this figure, it will be noted that heaters 12 and 31 are connected in series under control of the main switch 32. The source of power for the heaters is indicated by line conductors $L_1$ and $L_2$ in this figure. It will be noted that the switch 33 is connected in shunt with the auxiliary heater 31 so that during periods when the switch 33 is closed the auxiliary heater 31 is deenergized. Conversely, when the switch 33 is open, the heater 31 is energized in series with the main heater 12 under control of the main switch 32.

Thermostatic operation of the switch 32 is effected by an insulating finger 44 carried by and movable with the swinging bracket 27 and engaging the spring support 37. The shunting switch 33 is thermostatically operated by a shoulder 45 also movable with the swinging bracket 27 and engageable with the resilient contact support 42. The temperature of the vessel at which the switch 32 is operated may be manually adjusted by a stem 46 engageable with the spring support 36 and suitably threaded in the frame 25. The upper end of the stem 46 is suitably secured to a manually operated handle or knob 47 carrying indicia as shown in Fig. 4, which indicia registers with an index 48. The temperature at which the switch 32 is opened and closed may be adjusted by rotating the knob 47 for adjusting the stem 46 and the movable contact 34 upwardly and downwardly, all of which is well understood.

The supporting frame 25 and the elements attached thereto are enclosed in a suitable heat insulating housing 49 which may serve as a handle for the cooking vessel. The housing 49 is secured to the frame in any suitable manner and may serve as a support for the spring terminals 17 and 18. Also, the index 48 may be integral with the top of the casing 49 as shown.

Referring now to the indicia shown in Fig. 4, it will be noted that an inactive or off position is provided wherein the main switch 32 is maintained open. Three operating ranges are provided, the first being a low temperature range indicated on the knob 47 as Warm. This is a low temperature cooking range for operations up to approximately 200° F. The second range of temperatures is a boiling range wherein a mean boiling temperature is maintained and the indicia HI, MED and LO indicate, respectively, high, medium and low intensities of boiling. The high temperature range indicated as Frying includes temperatures above the boiling range and up to approximately 400° F.

The control as shown in Fig. 3 is in the "off" position wherein the switch 32 is maintained open. When the knob 47 is adjusted into the low temperature range, the switch 32 is closed and is cycled by the finger 44 in response to changes in temperature of the vessel that are reflected by the thermostatic element 16. At this time, the switch 33 is closed shunting out the heater 31. Accordingly, the thermostatic element 16 is heated solely by the vessel 10. In this low temperature range, the switch 33 remains closed since there is insufficient movement of the shoulder 45 to engage the spring support 42.

With the knob 47 adjusted into the boiling range or above 200° F. in the embodiment disclosed, the shoulder 45 moves downwardly into engagement with the spring contact support 42 for opening switch 33 and energizing heater 31 when the temperature of the thermostatic element 16 exceeds 200° F. It will be understood that the vessel temperature during boiling operations remains at substantially 212° F. and, if different rates or intensities of boiling are to be obtained, something other than vessel temperature must be employed to vary the percentage of time the switch 32 is closed. The heater 31 accomplishes this operation. With the knob set at LO for low intensity boiling, the switch 32 opens with very little heat supplied to the thermostatic element 16 by heater 31 so that the percent of "on" time of the main heater 12 is low. Advancing the knob toward the HI high intensity setting depresses the contact 34 so that more heat is required of the heater 31 to open switch 32 and, therefore, the percent of "on" time of the heater 12 is high. Accordingly, different rates or intensities of boiling are obtained by adjusting the switch 32 relative the thermostatically actuated finger 44.

When the knob 47 is adjusted into its high temperature or Frying range, cycling of the switch 32 solely in response to vessel temperature is required. Accordingly, the switch 33 is forced closed and out of range of its operating shoulder 45 for deenergizing the heater 31 throughout this high temperature range. A pin 51 slidably mounted in the frame 25 rests upon the spring support 41 and its upper end is contiguous the bottom of the handle 47. An arcuate cam 52 extending downwardly from the bottom of the handle engages the pin 51 throughout the range of adjustment of the handle 47 in the high temperature range and depresses the pin 51 for closing switch 33 and moving its actuating contact support 42 out of the range of movement of the shoulder 45.

From the foregoing, it is believed apparent that an improved control means is provided for a cooking vessel in which low and high temperature cooking operations, as well as boiling operations, are carried out. The thermal responsive element receives heat solely from the vessel during said low and high temperature operations and actuates the main switch for the vessel to maintain the latter at a predetermined temperature. During boiling, the thermal responsive element receives heat from the auxiliary heater also and the control then functions as a wattage control wherein the effective wattage of the main heater is varied depending upon the percentage of time the main contacts are closed. Accordingly, the intensity or the rate of boiling is varied in the boiling range. A single auxiliary switch is provided for the auxiliary heater and a single main switch is employed. These two switches are actuated by a single thermal responsive element to effect the foregoing operations. The arrangement is such that, when the control is adjusted to the boil range from a cold condition, the main switch remains closed until boiling temperature is attained and, during this heating process, the auxiliary heater remains deenergized. Accordingly, rapid heating of water in the vessel is continuously effected before the boiling temperature is attained.

While the invention has been shown in but one form, it will be obvious to those skilled in the art that it is not so limited, but is susceptible of various changes and modifications without departing from the spirit thereof.

What is claimed is:

A control for a cooking vessel having an electric heater, said control comprising a thermostatic element moved responsive to the temperature of said vessel, a main switch actuated by said thermostatic element for controlling energization of the vessel heater to provide three ranges of temperature of the cooking vessel, one of said ranges being lower than the boiling temperature of water, a second range including said boiling temperature and a third range being higher than said boiling temperature, manually operable means for adjusting said main switch to vary the temperature sensed by said thermostatic element at which said element actuates said main switch, an auxiliary heater for said thermostatic element in series with said main switch, an auxiliary switch for shunting said auxiliary heater when closed and being self-closed in said one range of vessel temperature, means actuated by said thermostatic element for opening said auxiliary switch in said second range of vessel temperature, and means actuated by said manually operable means for closing said auxiliary switch in said third range of vessel temperature.

References Cited in the file of this patent

UNITED STATES PATENTS

| | | |
|---|---|---|
| 1,593,638 | Moyer | July 27, 1926 |
| 2,350,148 | Bostwick | May 30, 1944 |
| 2,409,420 | Clark | Oct. 15, 1946 |
| 2,830,166 | Loomis | Apr. 8, 1958 |
| 2,847,553 | Smith | Aug. 12, 1958 |
| 2,847,554 | Huffman | Aug. 12, 1958 |